(12) United States Patent
Ueyama et al.

(10) Patent No.: US 7,765,644 B2
(45) Date of Patent: Aug. 3, 2010

(54) HINGE DEVICE

(75) Inventors: Tomoki Ueyama, Tottori (JP);
Yoshitomo Sakai, Osaka (JP); Toshiya Ishibashi, Osaka (JP)

(73) Assignees: Sanyo Electric Co., Ltd., Moriguchi-shi (JP); Tottori Sanyo Electric Co., Ltd., Tottori-shi (JP); Kasatani Corp., Osaka-shi (JP)

( * ) Notice: Subject to any disclaimer, the term of this patent is extended or adjusted under 35 U.S.C. 154(b) by 437 days.

(21) Appl. No.: 11/814,761

(22) PCT Filed: Jan. 24, 2006

(86) PCT No.: PCT/JP2006/301053
§ 371 (c)(1),
(2), (4) Date: Jul. 25, 2007

(87) PCT Pub. No.: WO2006/080308
PCT Pub. Date: Aug. 3, 2006

(65) Prior Publication Data
US 2009/0013500 A1    Jan. 15, 2009

(30) Foreign Application Priority Data
Jan. 25, 2005  (JP) .................. 2005-017124
Oct. 5, 2005   (JP) .................. 2005-292020

(51) Int. Cl.
*E05D 7/00* (2006.01)
(52) U.S. Cl. .................................. 16/354; 16/366
(58) Field of Classification Search ............. 16/354, 16/366; 49/382, 383; 160/229.1, 231.2, 160/232, 236; 455/575.1–575.4, 90.3, 90.1; 379/433.13, 433.12; 361/679.06, 679.12, 361/679.27
See application file for complete search history.

(56) References Cited
U.S. PATENT DOCUMENTS 2,206,739 A * 7/1940 Brogren et al. ............. 16/354
4,765,027 A * 8/1988 Andric ...................... 16/354
5,102,084 A * 4/1992 Park ...................... 248/286.1
5,867,872 A * 2/1999 Katoh ....................... 16/337
6,519,812 B2 * 2/2003 Ko et al. .................... 16/354
6,925,684 B2 * 8/2005 Kang et al. ................. 16/264
2006/0238970 A1 * 10/2006 Ukonaho et al. .......... 361/683
2007/0226955 A1 * 10/2007 Cho et al. ................... 16/354

FOREIGN PATENT DOCUMENTS

EP    1614913 A1    1/2006

(Continued)

OTHER PUBLICATIONS

International Search Report of PCT/JP2006/301053, date of mailing Apr. 25, 2006.
English language translation of International Preliminary Report on Patentability of International application No. PCT/JP2006/301053, (Form PCT/IB/373 and Form PCT/ISA/237) issued on Jul. 31, 2007.

*Primary Examiner*—Chuck Y. Mah
(74) *Attorney, Agent, or Firm*—Westerman, Hattori, Daniels & Adrian, LLP

(57) ABSTRACT

A hinge device having a first installation frame (10) installed on a first housing (2); a second installation frame (20) installed on a second housing (3); a third installation frame (30) for rotatably supporting a base end section of each of the frames, the base end sections being supported such that a head section side of each frame is rotatable in a direction to approach to and separate from each other, the base end sections being supported through a first main shaft (40) and a second main shaft (50) that are arranged parallel to each other and to which rotation of the frames is transmitted; a rotation force transmission mechanism (80) disposed between the main shafts (40, 50) and including gears (81, 82) having a function of transmitting reverse rotation force from one to the other and vice versa; and a rotation angle restriction means (60). The hinge device enables stable closing operation in which displacement between the housings does not occur.

3 Claims, 6 Drawing Sheets

FOREIGN PATENT DOCUMENTS

| | | |
|---|---|---|
| JP | 3083003 U | 1/2002 |
| JP | 2004052892 A | 2/2004 |
| JP | 2004308710 A | 11/2004 |
| JP | 2005155750 A | 6/2005 |
| JP | 2006064000 A | 3/2006 |
| WO | 2004090355 A1 | 10/2004 |

* cited by examiner

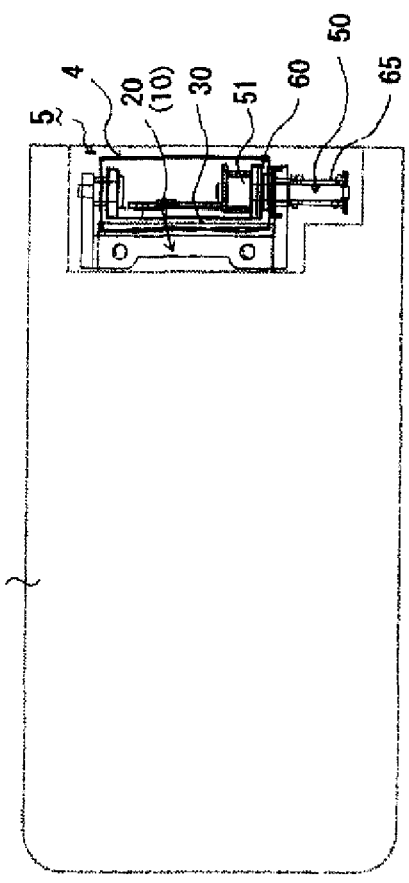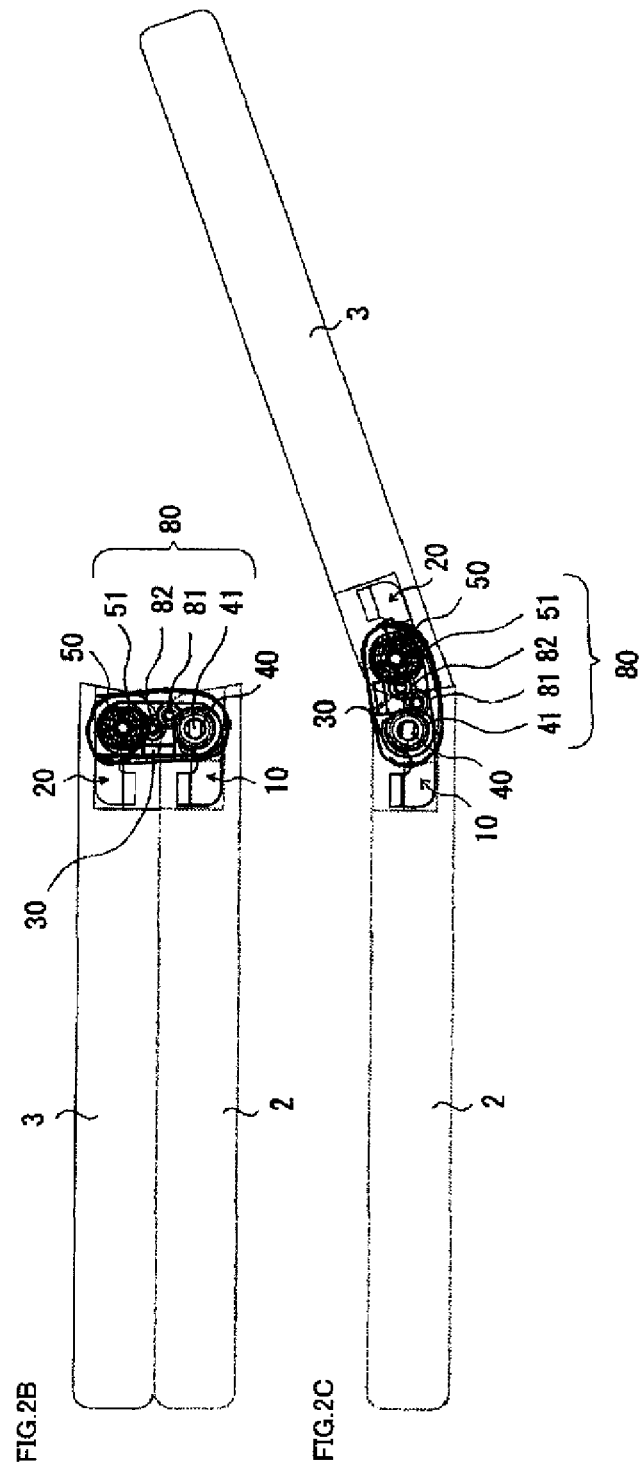

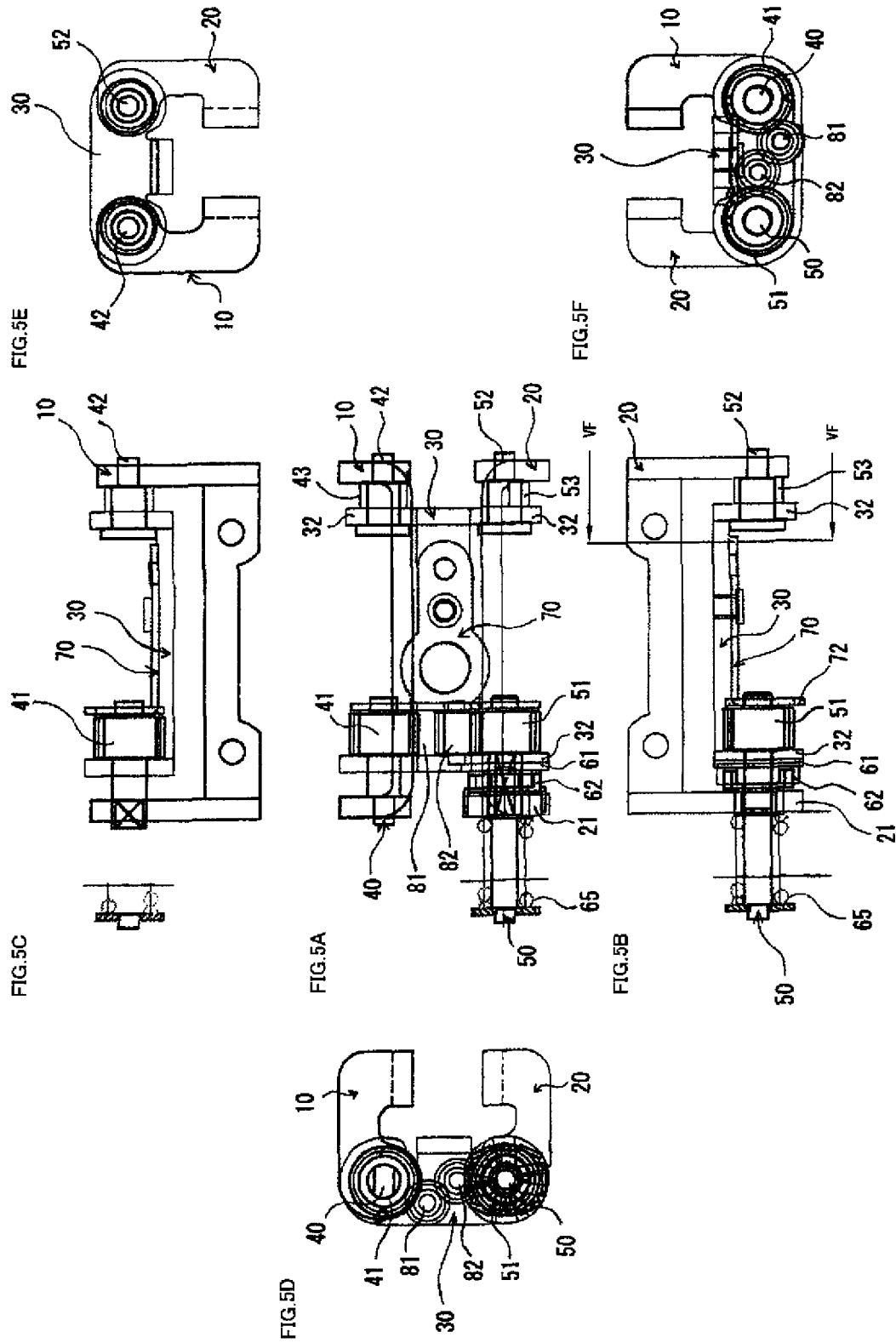

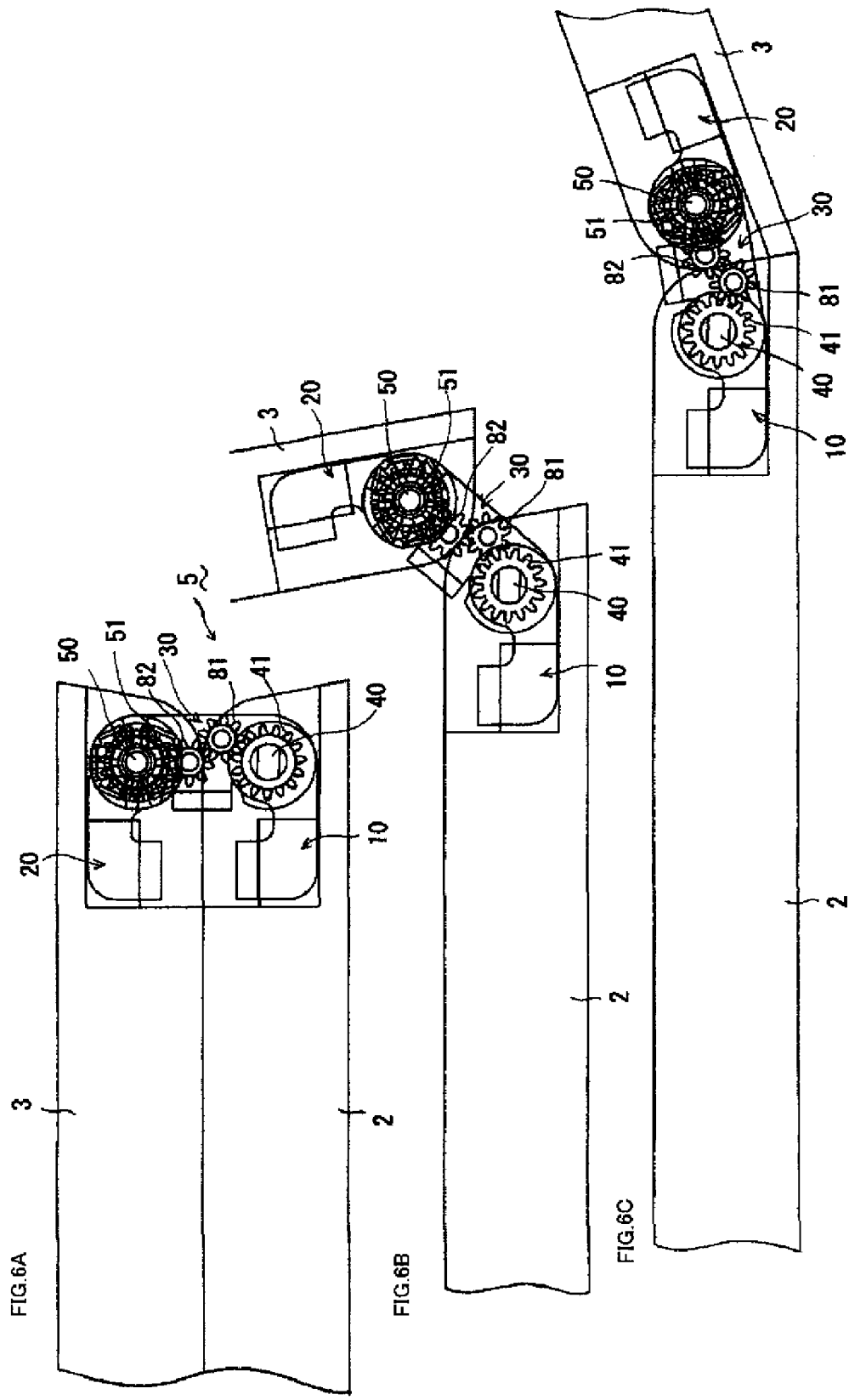

HINGE DEVICE

TECHNICAL FIELD

The present invention relates to a hinge device that is attached to two housings and that can be closed when folded together. The present invention particularly relates to a hinge device that is ideal for a cellular phone, a notebook computer, or another folding electronic apparatus.

BACKGROUND ART

Conventional hinge devices of this type involve providing a rotatable support member that supports a shaft to one of two housings and providing a bearing part that fits over the shaft to the other housing. The two housings are rotatably supported by one or two shafts (see, e.g., Patent Documents 1, 2).

[Patent Document 1]: Japanese Laid-open Patent Application No. 2004-52892

[Patent Document 2]: Japanese Laid-open Patent Application No. 2004-308710 (FIGS. 1, 4, 5 and paragraphs [0001] through [0015])

DISCLOSURE OF THE INVENTION

Problems the Invention is Intended to Solve

The hinge device described in Patent Document 1 has a configuration in which the two housings are rotatably held together by a singe common support shaft. In this configuration, an arm part must protrude from one of the housings when the shaft part is provided within the other housing, or, alternatively, the shaft part will protrude when the shaft part is provided outside the housings. The arm part or the shaft part therefore protrudes when the housings are unfolded, and the opened surfaces protrude without forming a continuous, flat surface. In this regard, the hinge device described in Patent Document 2 supports the two housings using two shafts, and therefore the linking parts of the housings do not protrude and the opened surface is flat.

In this hinge device, however, a pair of hinge mechanisms, which are rotatably supported by the two shafts, operate independently with regard to a linking member, and the two housings therefore slide past one another when folded together. When both housings have the same shape, the housings may not overlap properly during folding, and one of the housings may be offset from the other housing.

This offset may feel unstable to the user and make the product appear to be defective. The housings must be slid together and overlaid in order to remedy the offset, forcing the user to perform extra operations. Since the two hinge mechanisms operate independently, one of the hinge mechanisms may hit the wall surface or other component of the frame, and the timing at which further rotation occurs will differ for each hinge mechanism; therefore, the opening and closing operations are inconsistent. One of the hinge mechanisms may hit a wall surface during the opening or closing operations. The user may experience an odd feeling when the rotation is impeded, and may not be able to be perform smooth opening and closing.

The present invention was devised in order to solve the problems inherent in such prior art, and it is an object thereof to provide a hinge device capable of a stable folding movement in which no displacement occurs, as well as to provide a folding electronic apparatus in which this hinge device is used.

Means for Solving the Abovementioned Problems

In order to achieve the above object, the present invention is a hinge device for folding and unfolding a first housing and a second housing, comprising a first installation frame installed on the first housing; a second installation frame installed on the second housing; a third installation frame for rotatably supporting a base-end section of each of the frames via a first main shaft and a second main shaft, which are arranged parallel to each other and to which rotation of the frames is transmitted, so that head section sides of the first installation frame and the second installation frame are rotatable in an approaching or separating direction; a rotation-force transmission mechanism for linking the first main shaft and the second main shaft and having a function of transmitting a reverse rotation force from one main shaft to the other; and a rotation-angle restriction means composed of a cam surface formed on the third installation frame and a cam follower that rotates integrally with at least one of the first main shaft and the second main shaft and that elastically engages with the cam surface. The first main shaft and the second main shaft are positioned within respective recesses formed at joining locations of the first housing and the second housing, which fold together, whereby an opened surface of the housings forms a continuous, approximately flat surface.

The rotation-transmitting mechanism of the present invention comprises first and second gears provided to the first and second main shafts, and an even number of gears that are interposed between the first and second gears, wherein the first and second gears and the gears of even number are linked together and constitute a gear train.

The gears of even number of the present invention are arranged on and secured to the third installation frame in a staggered, interlocked state, and the first and second gears have a smaller diameter than the gears of even number.

Effect of the Invention

According to the hinge device of the present invention, the first installation frame on the first housing side and the second installation frame on the second housing side are axially supported by the third installation frame via the first and second main shafts, and the first and second main shafts are linked by the rotation-force transmission mechanism for transmitting a reverse rotation force. Therefore, when, e.g., the first installation frame rotates about the third installation frame in one direction, the second installation frame also rotates about the third installation frame in the opposite direction, and the operation for opening the housings therefore proceeds smoothly. Furthermore, the rotation of the first installation frame and the rotation of the second installation frame are linked. Therefore, when the folding apparatus in the prior art is in the folded state, the positions of the housings will be offset if the two shafts are independent. However, such offset does not occur in the present invention because the two shafts are linked by the rotation-force transmission mechanism. In other words, if this hinge device is applied to, e.g., a folding cellular telephone, there will be no offset in the positions of the upper and lower housings thereof, and a sense of stability can be conveyed to the user.

Since the first and second main shafts are built into the interior of the respective first and second housings, the protrusions and cavities on the main shaft parts of the prior art are not present. The opened surface of the two housings can therefore be made into a continuous, flat surface. The first main shaft and the second main shaft are linked by a mechanism for transmitting reverse rotation force, and the rotation-angle restriction means is also present. The opened surface will accordingly be continuously flat, yielding a thin profile, and a snap action can be obtained for the folding and unfolding operations of the first housing and the second housing.

According to this invention, when one of the first or second installation frames is made to rotate, the other installation frame is made to rotate in the opposite direction, and the operation for opening the first and second housings can therefore be performed smoothly. The gears of even number are fixed in position on the third installation frame in a staggered, interlocked fashion, whereby the distance between the support shafts of the first and second gears can be shortened. The apparatus can therefore be made thinner. The first and second gears have small diameters, whereby protruding parts need not be provided to the first and second housings, and the first and second gears can be stored within recesses of the housings.

BRIEF DESCRIPTION OF THE DRAWINGS

FIG. 2 shows the schematic configuration of the hinge device of the folding electronic apparatus according to the present embodiment, wherein FIG. 2A is plan view in which the housings are dosed, FIG. 2B is a sectional side view in which the housings are closed, and FIG. 2C is a sectional side view in which the housings are open;

FIG. 5 is a diagram that shows the same hinge device in third-angle projection, wherein FIG. 5A is a top view, FIG. 5B is a front view, FIG. 5C is a back view, FIG. 5D is a left-side view, FIG. 5E is a right-side view, and FIG. 5F is a view from the line VF-VF in FIG. 5B; and FIG. 6 is a diagram that shows the opening and dosing operation of the first housing and the second housing according to the above hinge device, wherein FIG. 6A is a sectional view of the closed state, FIG. 6B is a sectional view of a partly opened state, and FIG. 6C is a sectional view of the open state.

KEY TO SYMBOLS

Figure 1:
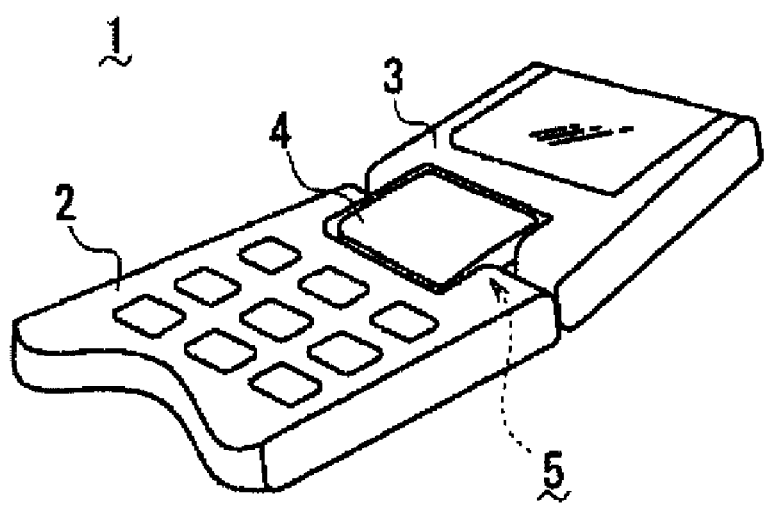
FIG. 1 is a partial schematic perspective view of a folding electronic apparatus provided with a hinge device according to an embodiment of the present invention.

1 Folding electronic apparatus
2 First housing
3 Second housing
5 Hinge device
10 First installation frame
11 Base-end section
12 Head section
20 Second installation frame
21 Base-end section
22 Head section
30 Third installation frame
40 First main shaft
41 Gear of the first main shaft
50 Second main shaft
51 Gear of the second main shaft
60 Rotation-angle restriction means
61 Cam surface
62 Cam follower
80 Rotation-force transmission mechanism
81, 82 Gear

BEST MODE FOR CARRYING OUT TIE INVENTION

Figure 3A:
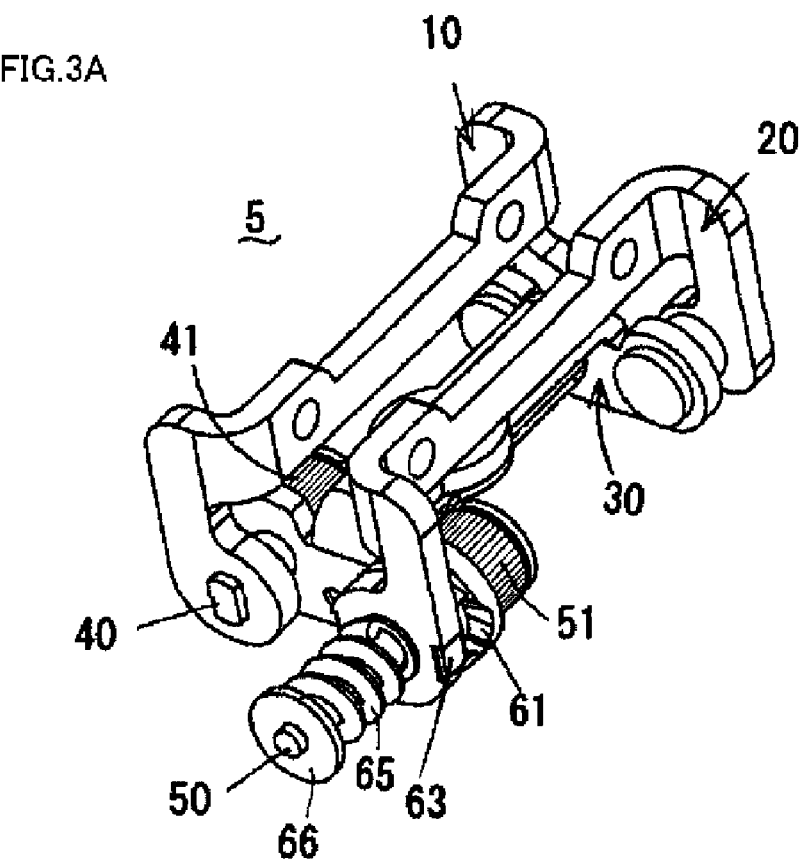
FIG. 3A is a perspective view in which the above hinge device is dosed.
Figure 3B:
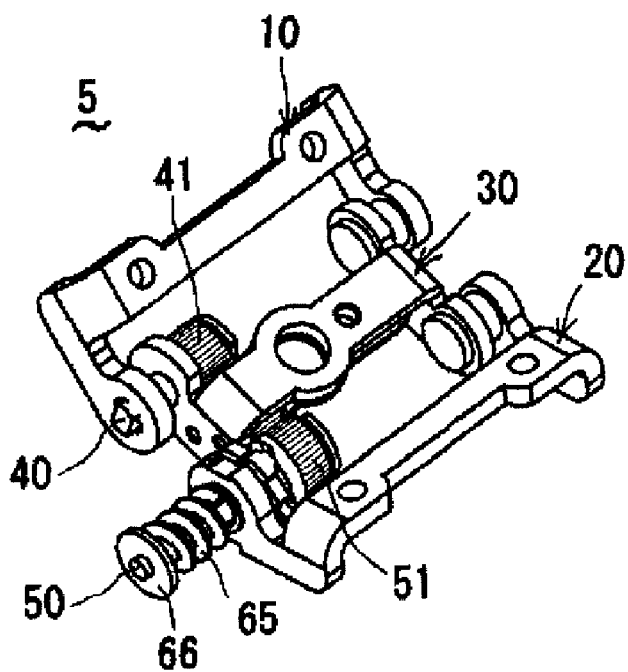
FIG. 3B is a perspective view in which the above hinge device is open.
Figure 4:
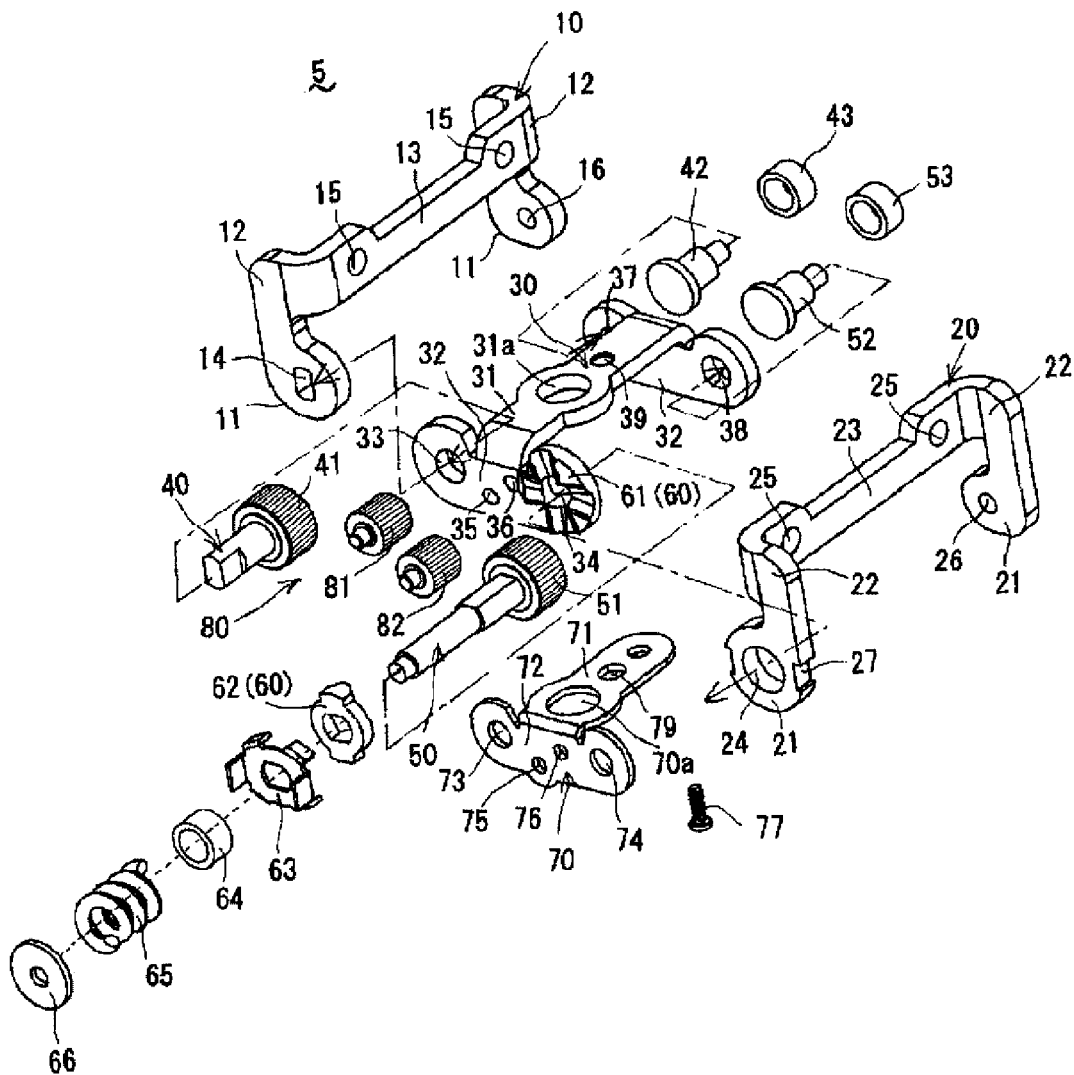
FIG. 4 is a disassembled perspective view of the above hinge device.

A hinge device according to an embodiment of the present invention and a folding electronic apparatus in which this hinge device is used will be described with reference to the drawings. FIGS. 1 and 2 show a folding electronic apparatus (a cellular telephone) 1 that has a first housing 2 and a second housing 3 capable of being folded together or unfolded, and that is provided with a hinge device 5 according to the present embodiment. FIGS. 3 through 5 show the detailed configuration of the hinge device 5, and FIG. 6 shows the opening and closing operation of the first housing 2 and the second housing 3 according to the above hinge device 5. The hinge device 5 portion is shown covered by a cosmetic cover 4 in FIG. 1. The schematic configuration of the hinge device 5 is shown in FIGS. 2A and 2B with a transparent view of cosmetic cover 4 and with the first housing 2 and the second housing 3 in a closed state. FIG. 2C shows the hinge device 5 with the transparent view of cosmetic cover 4 and with the first housing 2 and the second housing 3 in an opened state.

As shown in FIG. 1, the cellular telephone 1 is provided with the thin, flat first housing 2 and second housing 3, which can be folded together and unfolded via the hinge device 5. A keyboard is provided to the first housing 2, and a liquid-crystal display is provided to the second housing 3. As shown in FIG. 2, the hinge device 5 is provided with a first installation frame 10 attached to the first housing 2, a second installation frame 20 attached to the second housing 3, and a third installation frame 30 that rotatably supports the installation frames 10, 20.

The first installation frame 10 and the second installation frame 20 are built into respective recesses formed at the joining locations of the folding first housing 2 and second housing 3, respectively, and are not provided with arty protruding parts.

The third installation frame 30 rotatably supports the base-end sections (as viewed from the third installation frame 30) of the first installation frame 10 and the second installation frame 20 via a first main shaft 40 and a second main shaft 50 that are positioned in parallel (see FIG. 2C). According to this configuration, the head sections of the first installation frame 10 and the second installation frame 20 can rotate so as to approach or separate from one another. The third installation frame 30 also rotatably holds gears 81, 82, which are serially positioned between a gear 41 of the first main shaft 40 and a gear 51 of the second main shaft 50. The even-numbered gear train that is composed of the gear 41, the gear 81, the gear 82, and the gear 51 constitutes a rotation-force transmission mechanism 80. The hinge device 5 is also provided with a rotation-angle restriction means 60 that is composed of a cam and an extending spring 65 or the like (see FIG. 2A).

The details of the configuration of this hinge device 5 will be described below with reference to FIGS. 3, 4, and 5. FIG. 3A is a perspective view that shows the hinge device in a folded state. FIG. 3B is perspective view that shows the hinge device in an opened state. FIG. 4 is a disassembled perspective view of the hinge device. FIG. 5 contains views of the hinge device of FIG. 3A viewed from the top, the front, the left, the right, and other perspectives. FIG. 5 shows the hinge device from different angles so as to be more readily understood.

As shown in FIG. 4, the first installation frame 10 is formed into an upside-down approximate U-shape from a metal plate or the like. The first installation frame 10 has symmetrical pairs of base-end sections 11 and head sections 12, as well as a linking part 13 that connects the head sections 12. A rectangular shaft hole 14 into which a D-cut part of the first main shaft 40 fits is provided to one of the base-end sections 11 (the base-end section 11 on the near side in FIG. 4, the same hereinafter), and a round shaft hole 16 into which the end of a first axle 42 fits is provided to the other base-end section 11

(the base-end section 11 on the far side in FIG. 4, the same hereinafter). Fixing holes 15 to which the housings attach are provided to the linking part 13. According to this configuration, applying a rotation force to the first installation frame 10 transmits that rotation force to the gear 41 of the first main shaft 40.

As with the first installation frame 10, the second installation frame 20 has symmetrical pairs of base-end sections 21 and head sections 22, as well as a linking part 23 that connects the head sections 22, as shown in FIG. 4. A large-diameter shaft hole 24, through which the second main shaft 50 passes, and a concave part 27, which engages with a coupling 63, are provided to one of the base-end sections 21, and a round shaft hole 26 into which the end of a second axle 52 fits is provided to the other base-end section 21. Fixing holes 25 to which the housings attach are provided to the linking part 23. The coupling 63 holds a cam follower 62 of the rotation-angle restriction means 60. The cam follower 62 is nonrotatably joined to the second main shaft 50. According to this configuration, applying a rotation force to the second installation frame 20 causes that rotation force to be transmitted to the gear 51 of the second main shaft 50.

As shown in FIGS. 4 and 5, the third installation frame 30 is composed of an upper area 31, which is formed from a metal plate or the like, and a pair of lateral areas 32, 32, which are bent at right angles on the left and right ends of the upper area 31. A shaft hole 33 that rotatably supports the first main shaft 40, a shaft hole 34 that rotatably supports the second main shaft 50, shaft holes 35, 36 that rotatably support the gears 81, 82, and a cam surface 61 of the rotation-angle restriction means 60 are provided to one of the lateral areas 32. The shaft hole 35 and the shaft hole 36 are staggered between the shaft hole 33 and the shaft hole 34. According to this positioning, the distance between the shaft hole 33 and the shaft hole 34 can be reduced despite the use of the gears 81, 82, which have a prescribed outside diameter, and the portable electronic apparatus 1 can be made thinner.

A shaft hole 37, which supports the first axle 42, and a shaft hole 38, which supports the second axle 52, are provided to the other lateral area 32. A screw hole 39 for fixing a supplementary installation frame 70 and an aperture 31a to which the cover 4 attaches are provided to the upper area 31.

The length of the upper area 31 regulates the pair of lateral areas 32, 32 of the third installation frame 30 so that the lateral areas 32, 32 are positioned between the pair of base-end sections 11, 11 of the first installation frame 10 and between the pair of base-end sections 21, 21 of the second installation frame 20.

As shown in FIGS. 4 and 5, the rotation-angle restriction means 60 includes the cam surface 61 and the cam follower 62. The rotation-angle restriction means 60 is also provided with the coupling 63, a sleeve 64, the extension spring 65, and a lock washer 66 in order to elastically engage the cam follower 62 with the cam surface 61 and in order to couple the movement of the cam follower 62 to the rotation of the second installation frame 20.

The assembly of the rotation-angle restriction means 60 involves first inserting the near-side shaft part of the second main shaft 50 into the shaft hole 34 of the third installation frame 30 and then fitting the cam follower 62, the coupling 63, and the sleeve 64 to this shaft part. The end of the shaft part is then passed through the large-diameter shaft hole 24 of the second installation frame 20, and the extension spring 65 is fit to the end of the shaft part. The extension spring 65 provides a pressing force to the cam follower 62 via the sleeve 64, which can move in the axial direction. The far-side shaft part of the second main shaft 50 is fit into a shaft hole 74 of the supplementary installation frame 70.

When the first installation frame 10 and the second installation frame 20 rotate relative to one another during the process of moving from an opened or closed state to the other state, the rotation-angle restriction means 60 functions to increase the load for initiating rotation. Once that load is exceeded, the load decreases, and the opened or closed state is stabilized. The folding and unfolding operation of the housings 2, 3 is thus provided with a snap-action.

As shown in FIGS. 4 and 5, the supplementary installation frame 70 supports the gears 41, 81, 82, 51 between the supplementary installation frame 70 and the lateral area 32 on one side of the third installation frame 30. The supplementary installation frame 70 is therefore composed of an upper area 71 and a lateral area 72. A screw hole 79, through which a fixing screw 77 is inserted, and an aperture 70a, which corresponds to the aperture 31a, are provided to the upper area 71. A shaft hole 73 for rotatably supporting the first main shaft 40, a shaft hole 74 for rotatably supporting the second main shaft 50, and shaft holes 75, 76 for rotatably supporting the gears 81, 82 are provided to the lateral area 72.

The other lateral area 32 (on the far side in FIG. 4) of the third installation frame 30 rotatably supports the other base-end sections 11, 21 (on the far side in FIG. 4) of the first installation frame 10 and the second installation frame 20 via the first and second axles 42, 52. Sleeves 43, 53 are fit onto the first and second axles 42, 52, respectively. The sleeves 43, 53 maintain a prescribed space between the other lateral area 32 of the third installation frame 30 and the other base-end sections 11, 21 of the first installation frame 10 and the second installation frame 20. A lateral surface of the cosmetic cover 4 passes through these empty spaces.

With the rotation-force transmission mechanism 80, the gears 41, 51 are fixed to the first and second main shafts 40, 50, respectively, and the gears 81, 82 are provided to be capable of rotation around central support shafts. The gear 41, the gear 81, the gear 82, and the gear 51 are configured as an even-numbered gear train.

When the rotation-force transmission mechanism 80 that is composed of this even-numbered gear train is provided between the first installation frame 10 and the second installation frame 20, and rotation force is applied to one of the first installation frame 10 or the second installation frame 20, the rotation-force transmission mechanism 80 functions to transmit a reverse rotation force to the other installation frame. In other words, when rotation force is applied to the first installation frame 10, the first main shaft 40 rotates, and the gear 41 rotates. The rotation of the gear 41 is transmitted to the gear 51 via the gears 81, 82. When the gear 51 rotates, the second main shaft 50 rotates. The cam follower 62, which is joined to the second main shaft 50, and the coupling 63 then rotate, and the second installation frame 20 that is engaged with the coupling 63 rotates. The cam follower 62 is elastically engaged with the cam surface 61, functioning as the rotation-angle restriction means 60. (See FIGS. 3 and 5.)

FIGS. 6A through 6C show the operation of the hinge device 5 when the second housing 3 (the second installation frame 20) is opened relative to the first housing 2 (the first installation frame 10) from the closed state. It can be seen that the first housing 2 and the second housing 3 form a continuous, flat surface when opened. This opened state results from the fact that two shafts, i.e., the first main shaft 40 of the first installation frame 10 and the second main shaft 50 of the second installation frame 20, are both housed within respective recesses of the first housing 2 and the second housing 3 and are supported by the third installation frame 30. To be more specific, the gears 41, 51 of the two shafts are linked by the rotation-force transmission mechanism 80, which includes the gears 81, 82. Therefore, the diameter of the gears 41, 51 of the two shafts can be reduced, and the gears 41, 51 of the two shafts can be housed in the respective recesses of the first housing 2 and the second housing 3 without any protruding parts being provided.

The first and second installation frames 10, 20 are axially supported by the third installation frame 30 via the first and second main shafts 40, 50. The first and second main shafts are linked by the rotation-force transmission mechanism 80, which transmits a reverse rotation force. Therefore, when, e.g., the first installation frame 10 rotates about the third installation frame 30 in one direction, the second installation frame 20 also rotates about the third installation frame 30 in the opposite direction, and the operation for opening the housings therefore proceeds smoothly. Furthermore, the rotation of the first installation frame 10 and the rotation of the second installation frame 20 are linked. Therefore, when the folding apparatus in the prior art is in the folded state, the positions of the housings will be offset if the two shafts are independent. However, such offset does not occur in this configuration because the two shafts are linked by the rotation-force transmission mechanism. In other words, there is no offset in the positions of the upper and lower housings of the cellular telephone, and a sense of stability can be conveyed to the user.

The rotation-angle restriction means 60 is provided to the rotation-force transmission mechanism 80, and therefore a thin, flat, and continuous opened surface can be obtained, and a snap action can be obtained for the opening and closing operations of the housings 2, 3, as described above.

The present invention is not limited to the configuration of the embodiment above, and the specific configuration may be designed as appropriate. For example, the relationships between the first housing 2 and the second housing 3 and between the first installation frame 10 and the second installation frame 20 may be reversed from the description above. The rotation-angle restriction means 60 was provided to the second installation frame 20 in the example above, but the rotation-angle restriction means 60 may be provided to the first installation frame 10 or to both of the installation frames. The supplementary installation frame 70 was used in the embodiment described above, but the present invention can be implemented without the supplementary installation frame 70. In the basic configuration of the present invention, the base-end sections of first and second installation frames, which are stored in respective folding housings, are held by two parallel shafts via a third installation frame, and gears provided to these two shafts are linked by an even number of gears. Anything that has this basic configuration is included in the present invention.

The invention claimed is:

1. A hinge device for folding and unfolding a first housing and a second housing, comprising:
    a first installation frame installed on the first housing;
    a second installation frame installed on the second housing;
    a third installation frame for rotatably supporting a base-end section of each of the first installation frame and the second installation frame via a first main shaft and a second main shaft, which are arranged parallel to each other and to which rotation of the frames is transmitted, so that head section sides of the first installation frame and the second installation frame are rotatable in an approaching or separating direction;
    a rotation-force transmission mechanism that links the first main shaft and the second main shaft and has a function of transmitting a reverse rotation force from one of the main shafts to the other; and
    a rotation-angle restriction means composed of a cam surface formed on the third installation frame and a cam follower that rotates integrally with at least one shaft selected from the first main shaft and the second main shaft and that elastically engages with the cam surface.

2. The hinge device according to claim 1, wherein
    the rotation-transmitting mechanism comprises first and second gears provided to the first and second main shafts; and
    an even number of gears that are interposed between the first and second gears, wherein
    the first and second gears and the gears of even number are linked together and constitute a gear train.

3. The hinge device according to claim 2, wherein the gears of even number are arranged on and secured to the third installation frame in a staggered, interlocked fashion.

* * * * *